Patented May 21, 1935

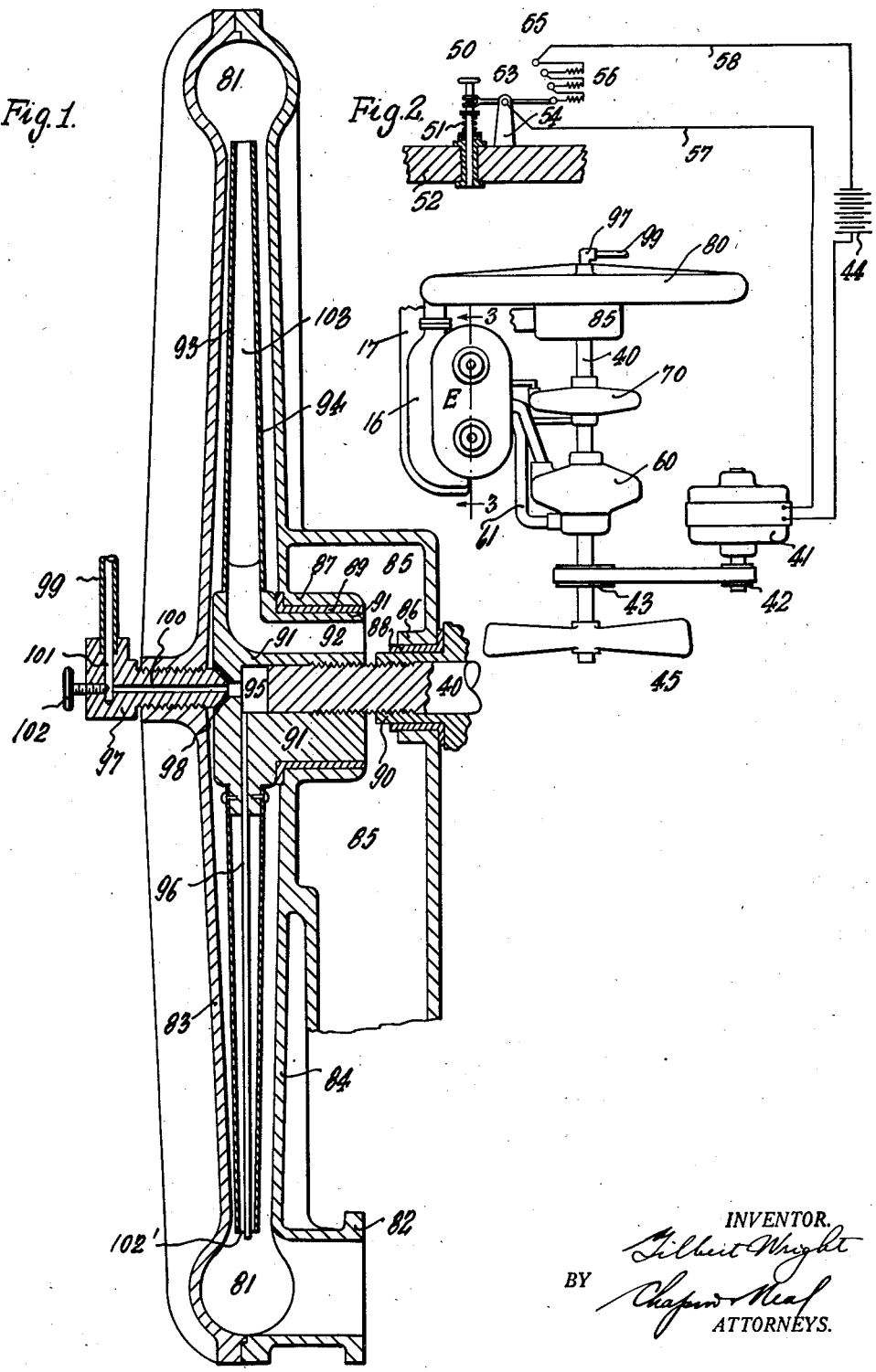

2,002,230

UNITED STATES PATENT OFFICE 2,002,230

INTERNAL COMBUSTION MOTOR

Gilbert Wright, Granville Center, Mass., assignor of one-half to Holland N. Stevenson, Pelham, N. Y.

Application January 4, 1930, Serial No. 418,624

2 Claims. (Cl. 123—198)

Introduction

This invention relates to internal combustion motors, preferably of the two-cycle type, and to a novel type of control therefor.

A number of attempts have been made to introduce the two-cycle engine in automobile practice; however, none of these attempts has met with lasting success. Among other reasons, the difficulty of satisfactorily operating and controlling two-cycle engines at idling speeds or at high speeds equal to or at least approaching those of modern four-cycle automobile engines has heretofore prevented the two-cycle engine from becoming a serious competitor of the four-cycle type in the field of automobile drives. One of the undisputed advantages of the two-cycle engine is its high overall volumetric efficiency as compared to the volumetric efficiency of the four-cycle engine of the same rating and speed of revolution. If speeds between 2000 to 3000 R. P. M. are selected, the time available for scavenging and charging is so short in the former two-cycle designs that regulation under variable charging and running conditions becomes very unreliable.

The advantages of my new control are particularly evident in engines for automobile and similar drives because the loads and speeds of such engines change almost continually and because partial loads preponderate. For this reason, I shall choose an automobile engine as the best illustration for my invention without intending to restrict the invention to such and similar drives.

Generally speaking, the object of this invention is to provide a high-speed two-cycle internal combustion engine of the type using a gaseous mixture under a low pre-compression, which engine operates under all load and speed conditions with practically constant mixture composition of the same pre-compression pressure, thus insuring excellent combustion under all conditions, and rendering the engine particularly suited for automobile and similar drives of continually changing speeds and partial loads; in other words, the object is to provide a high-speed internal combustion engine of said kind which requires little space and little first cost compared to an equivalent four-cycle engine, and has a better overall efficiency than the four-cycle engine. Still other objects and advantages of the invention will appear in later paragraphs of the specification.

Drawing

In the drawing—

Fig. 1 is a horizontal cross-section through the mixture pump, also showing the separate admission conduits for the air and fuel supply; and Fig. 2 is a schematic illustration of the preferred form of arrangement on one and the same shaft of the auxiliary apparatus comprising the mixture pump, the water and oil circulating pumps, and the fan; also showing the electric motor drive for the shaft and the electric connection between the accelerator pedal and the electric motor.

Fig. 2 is a schematic illustration of the assembling of the engine E with the auxiliary apparatus. For the sake of simplicity only one cylinder block with two cylinders is shown, and the auxiliary equipment is so arranged besides the block as to give a clear and simple picture of the connections. The actual position of the auxiliary shaft 40 with respect to the engine will depend upon structural considerations and, therefore, vary according to the circumstances.

The auxiliary shaft 40 is, in the embodiment illustrated, driven from an electric motor 41 by means of the pulleys 42 and 43. The motor receives its power from a battery 44 and its speed is controlled from the accelerator pedal 50. Normally, the accelerator pedal is urged upwardly away from the floor board 52 by the spring 51. A lever arm 53 pivoted on a post 54 is connected at its one end to the pedal by means of a fork engagement. The other free end of the lever arm rides over a number of electric contacts. Normally, the lever bears on the lowermost contact, as shown in the figure. In this position the electric current will flow from the battery 44 through the motor 41, the wire connection 57 to the lever arm 53, and thence by way of the contact through the entire set of resistances 56 and back through wire 58 to the battery. But when the driver depresses the pedal more and more resistance will be cut out until at the uppermost contact engagement all resistance is cut out, thus allowing the motor to run at its maximum speed.

This arrangement may, of course, be modified in various ways. However, the principle of this or any other equivalent arrangement which I wish to emphasize here is that the speed of the auxiliary shaft is entirely independent of the working conditions of the engine and is exclusively controlled by the operator of the engine.

The auxiliary shaft 40 drives the radiator fan 45, the water circulation pump 60, the oil circulation pump 70, and the mixture pump 80. This common drive of the various auxiliary apparatus from a shaft controlled in the way as stated before represents a preferred form of coupling. The fan, the water pump, and the oil pump might also be mounted in the usual manner on shafts driven from the engine. But, as will be seen later on, the common drive has decided advantages over the separate drives.

All pumps are of the centrifugal, radially discharging type with axial admission of the fluid to the impeller. All of them operate on the same hydraulic principle and, for this reason, I shall confine myself to a more detailed description of the mixture pump, which is shown in cross-section in Fig. 1.

Structure of the mixture pump

The casing of the pump consists of two halves 83 and 84 which form a mixture chamber 81 between their peripheral portions. This mixture chamber opens through a flange attachment 82 into the admission channel 16 of the engine cylinders. One of the two halves of the casing carries the air intake chamber 85. At 86 and 87 the casing is provided with bearing surfaces which, by means of interposed sleeves 88 and 89 support the stationary casing on the rotating sleeve 90 and the rotating hub 91 respectively. The sleeve and hub are rigidly connected to the auxiliary shaft 40. The hub is provided with a plurality of circumferentially spaced air inlet conduits 92. Also circumferentially spaced on the hub, but always situated between two consecutive air inlets, are a number of fuel jet pipes 96. The hub carries two disks 93 and 94 which form between their inner faces the concentric space 103 and, together with the hub, represent the impeller of the pump. The air which enters the impeller through the inlet conduits 92 is driven radially outwardly and is being compressed during this travel, for which reason the space between the disks is made tapering towards the periphery.

The fuel is fed from a fuel tank through pipe connection 99. The cap 97 is screwed down in the casing of the pump until it bears on the conical faces 98 of the hub. In this way a fluid-sealed cavity 95 adjacent the extremity of shaft 40 is obtained from where the fuel is driven by centrifugal forces through the fuel jet pipes 96. The cap is provided with bores 100 and 101 and the fuel passage through these bores may be regulated by the adjusting screw 102. For clearness, in the figure and description as well, all structural details have been omitted as far as they are not necessary for an understanding of the working principles of this pump. Various structural modifications could be made to produce the same effect. The space between the disks is preferably subdivided in a plurality of sectors by vanes 102' radially or spirally extending between the disks, to produce the usual impelling action common to centrifugal blowers.

Operation of the mixture pump

I shall now explain the behavior of the mixture pump under various driving conditions. In this context, the admission system as a whole should be thought of as comprising the pump which generates a hydraulic head proportional to the square of the angular velocity of the impeller, the admission conduits, the annular admission channel, the ports, the cylinder and the exhaust conduits. The propagation of the charge in the system will generally be proportional to the speed of the impeller.

The generated hydraulic heads in the pump are not the same for the fuel and for the air, because of the different specific gravities of the two substances. But the higher head in the fuel pipes of the impeller is a desirable feature, since it permits the use of very fine nozzle openings which destroy part of the generated head by finely distributing the fuel jet, thus causing a very thorough mixture of the fuel and the air. As a consequence, the mixture obtained in the peripheral chamber 81 of the pump contains the gasoline in a vaporous state. In the standard carburetors, due to the required much wider opening of the jet nozzle, the gasoline is suspended in the air in liquid form. It is a known fact that, in order to overcome the disadvantages of such a suspension mixture, many makers of cars provide their carburetors with pre-heating devices. It would, of course, also be possible to reduce the head of the fuel by keeping the fuel pipes shorter. I prefer, however, to extend the fuel pipes to the peripheral discharge opening of the disks 93, 94, as shown in Fig. 1, in order to obtain the desired vaporization effect stated before.

With given dimensions of the air and fuel discharge openings in the impeller of the pump, the ratio of the fuel head to the head of the air will be the same for all speeds of the impeller. If at the same time the conditions in the admission system as a whole remain unaltered, the mixture composition, that is the proportion of fuel and air in the mixture, will remain constant, irrespective of the running condition of the engine and the pump. Since in my design there are no variable throttling means inserted between the mixture preparing device (pump or carburetor) and the admission ports, the mixture composition will be the same at all times, disregarding minor changes such as due to variations in the atmospheric pressure, etc. Without disturbing this constancy of mixture composition, throttling means for the fuel and the air may, however, be provided before the entrance of the mixture constituents into the pump. I prefer to use a small adjusting screw 102 for the exclusive regulation of the fuel flow. This screw adjustment is supposed to be permanent for a given engine design.

Instead of a mixture pump working on the principles as set forth before, I might, of course, use other means for the preparation of a suitable mixture. For instance, entirely separate means for the mixing process and for the charging function could be provided, or, a combined mixing and charging device could be so designed as to first suck the fuel and air into a separate mixing chamber and then press it from there into the admission system. Such and similar modifications would, naturally, lie within the scope of my invention.

Operation of engine in connection with mixture pump

The reason why I prefer the mixture pump, as described before, is because this design has a number of decided advantages over other constructions which might take its place. The rectilinear relation between the speed of the impeller and the pressure of the charge introduced into the cylinder and the reliability of receiving a constant-composition mixture from the pump have been pointed out already before. Other advantages are the small space required by the pump and the low inertial momentum of the runner, which latter feature makes it possible to accelerate the pump rapidly and, consequently, to change almost instantaneously from one speed of the car to another, a possibility of paramount importance in the operation of an automobile. In order to insure the possibly greatest flexibility of acceleration and retardation with a comparatively low torque and low momentum electric motor I, preferably, make the auxiliary shaft, the impeller of the pump, and all other parts coupled to the auxiliary shaft from light aluminum alloys. When the driver suddenly lifts his foot from the accelerator pedal, my engine will, then, brake the speed of the car in the same way as is the case in a car of standard equipment.

Operation of the water, air, and oil circulation

It has been mentioned already before that the oil and water pumps are designed along the same general lines as the mixture pump, and they operate on the same general hydraulic principles. The fluid current circulated in these two systems will be a function of the speed of the auxiliary shaft. The speed of the auxiliary shaft determines the average indicated load of the cylinder, irrespective of the speed of the engine, and this load is practically proportional to the speed of the auxiliary shaft. With a sufficient degree of approximation it may be said then that the cooling effect on the engine is nearly proportional to the load of the engine. In a similar way it may be said that the mean heat transmission from the total heat dissipating surfaces of the cylinder is fairly proportional to the mean indicated load on the cylinders. If, according to my preferred arrangement, also the radiator fan is driven from the auxiliary shaft similar considerations as to heat dissipation will apply to the radiator. From this, then, it follows that the temperature of the engine will change but little under varying load and speed conditions of the engine provided, of course, that the atmospheric temperature is the same.

It is a known fact that standard automobile engines show a very different behavior. They are overcooled at lower loads and medium speeds, they become too warm at high speeds, and they heat up excessively when climbing grades for some longer time. The cooling effect in these engines is nearly proportional to the speed of the car, while the load varies approximately with the third power of the speed. The faulty operation of the carburetor on grades results in an over-development of waste heat, while the cooling effect is diminished by the drop in speed.

For these reasons, the cooling plant of standard engines is considerably overrated for normal driving conditions. Besides other undesirable effects, the result of such overrating is a reduction in output of the fuel. Artificial means such as thermostats in the circulation cannot materially improve these conditions. It will be understood now that for high pre-compression ratios I can, with my arrangement, resort to more powerful cooling effects without impairing the fuel output by influences such as prevail in standard engines. In other words, the principle of my preferred cooling plant is another factor which tends to raise the overall efficiency of the car.

The lubrication of an engine is also to a certain extent determined by the load on the engine. For this reason and for the sake of simpler arrangement I prefer to drive the oil pump from the auxiliary shaft.

What I claim is:

1. An internal combustion motor having cylinder, piston, and valve mechanism, motive means operable at a speed independent of that of the motor, a pump for gaseous fuel actuated by said motive means, and a pump for cooling fluid actuated by said motive means.

2. An internal combustion motor having mechanism for supplying a combustible gas thereto, means for varying the rate of supply of said gas independently of the speed of the motor, and means for causing a flow of cooling fluid to the motor at a rate proportional to the rate at which said gas is supplied to the motor.

GILBERT WRIGHT.